United States Patent
Peterson

(10) Patent No.: US 8,864,204 B2
(45) Date of Patent: Oct. 21, 2014

(54) CENTER PANEL ASSEMBLY FOR A VEHICLE BODY

(71) Applicant: Honda Motor Co., Ltd., Tokyo (JP)

(72) Inventor: Michael Vincent Peterson, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 47 days.

(21) Appl. No.: 13/707,953

(22) Filed: Dec. 7, 2012

(65) Prior Publication Data

US 2014/0158447 A1 Jun. 12, 2014

(51) Int. Cl.
  *B62D 25/16* (2006.01)
  *B62K 11/00* (2006.01)
  *B62K 5/01* (2013.01)
  *B62K 19/48* (2006.01)

(52) U.S. Cl.
  CPC . *B62K 11/00* (2013.01); *B62K 5/01* (2013.01); *B62K 19/48* (2013.01)
  USPC .......................... 296/1.08; 296/198; 280/847

(58) Field of Classification Search
  CPC ...... B62K 5/01; B62K 2202/00; B62K 19/46; B62J 17/02; B62J 17/06; B60K 15/01; B60K 17/06; B60K 17/22; B60K 17/344; B60K 5/02; B60R 13/083; B60R 13/0838; B60R 13/0884; B60R 3/002; B60Y 2200/124
  USPC .............. 296/1.08, 64, 190.03, 65.05, 69, 66, 296/182.1, 183.2, 183.1, 63, 186.4, 65.01
  See application file for complete search history.

(56) References Cited

U.S. PATENT DOCUMENTS

| | | | |
|---|---|---|---|
| 4,535,869 A * | 8/1985 | Tsutsumikoshi et al. ...... | 180/311 |
| 4,596,301 A * | 6/1986 | Nagashima ................... | 180/215 |
| D352,683 S | 11/1994 | Miller | |
| 6,523,634 B1 | 2/2003 | Gagnon et al. | |
| 7,097,188 B2 | 8/2006 | Takeshima et al. | |
| 7,300,101 B2 | 11/2007 | Ohzono | |
| 7,591,503 B2 * | 9/2009 | Schroeder et al. ............ | 296/198 |
| 7,681,920 B2 * | 3/2010 | Iwasaki ......................... | 280/831 |
| 7,740,100 B2 | 6/2010 | Takahashi et al. | |
| 2009/0014970 A1 * | 1/2009 | Peterson ......................... | 280/29 |
| 2009/0038875 A1 | 2/2009 | Michalke et al. | |

* cited by examiner

*Primary Examiner* — Glenn Dayoan
*Assistant Examiner* — Sunsurraye Westbrook
(74) *Attorney, Agent, or Firm* — Ulmer & Berne LLP

(57) ABSTRACT

A center panel assembly for a body of a vehicle includes a left cover, a right cover, a top cover, and a plurality of fasteners. The top cover is releasably attached to the left cover with at least a first one of the plurality of fasteners and is releasably attached to the right cover with at least a second one of the plurality of fasteners. The center panel assembly is configured for releasable attachment to a frame of a vehicle.

18 Claims, 6 Drawing Sheets

CENTER PANEL ASSEMBLY FOR A VEHICLE BODY

TECHNICAL FIELD

The present application relates generally to vehicle bodies, and more particularly, to center panel assemblies for vehicle bodies.

BACKGROUND

Known all terrain vehicles include body structures having various panels attached directly to a frame of the all terrain vehicle.

SUMMARY

According to one embodiment, a center panel assembly for a body of a vehicle includes a left cover, a right cover, a top cover, and a plurality of fasteners. The top cover is releasably attached to the left cover with at least a first one of the plurality of fasteners and is releasably attached to the right cover with at least a second one of the plurality of fasteners. The center panel assembly is configured for releasable attachment to a frame of a vehicle.

According to another embodiment, a vehicle includes a frame, at least one front wheel rotatably coupled with the frame, and at least one rear wheel rotatably coupled with the frame. The vehicle also includes an engine supported by the frame and a body supported by the frame. The body includes a front fender assembly, a rear fender assembly, and a center panel assembly, which extends longitudinally from the front fender assembly to the rear fender assembly. The center panel assembly covers the engine and is releasably attached to at least one of the frame, the front fender assembly, and the rear fender assembly. The center panel assembly includes a left cover, a right cover, a top cover, a first plurality of fasteners and a second plurality of fasteners. The top cover is releasably attached to the left cover with the first plurality of fasteners and is releasably attached to the right cover with the second plurality of fasteners.

According to another embodiment, a saddle-type vehicle includes a frame, at least one front wheel rotatably coupled with the frame and at least one rear wheel rotatably coupled with the frame. The saddle-type vehicle also includes a handlebar assembly coupled with the at least one front wheel. The saddle-type vehicle further includes an engine supported by the frame and a body supported by the frame. The body includes a front fender assembly, a rear fender assembly, and a center panel assembly. The center panel assembly includes a left cover, a right cover, a top cover, a first plurality of fasteners, a second plurality of fasteners and a third plurality of fasteners. The saddle-type vehicle also includes a saddle-type seat supported by at least one of the frame and the body. The center panel assembly extends longitudinally from the front fender assembly to the rear fender assembly and covers the engine. The center panel assembly is releasably attached to at least one of the frame, the front fender assembly, and the rear fender assembly with the third plurality of fasteners. The top cover includes an exterior surface, an interior surface, and a plurality of mount structures integral with the interior surface. At least some of the first plurality of fasteners releasably attach the left cover to respective ones of the mount structures of the top cover, and are obscured from view. At least some of the second plurality of fasteners releasably attach the right cover to respective ones of the mount structures of the top cover, and are obscured from view.

BRIEF DESCRIPTION OF THE DRAWINGS

Various embodiments will become better understood with regard to the following description, appended claims and accompanying drawings wherein:

DETAILED DESCRIPTION

Figure 1:
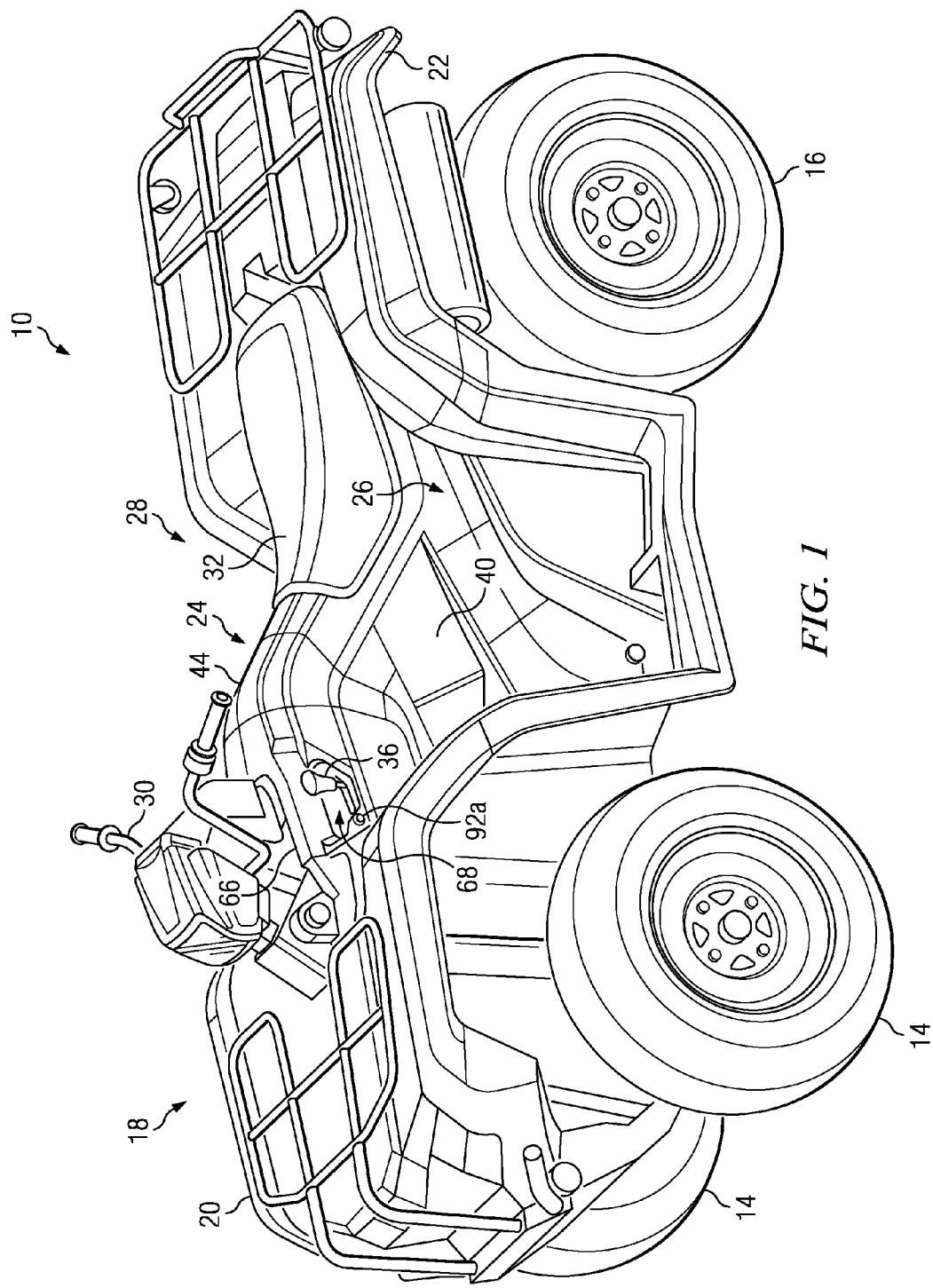
FIG. 1 is a left-front perspective view of a vehicle depicting a center panel assembly of a body of the vehicle according to one embodiment.

Referring to the drawings, wherein like numbers indicate the same or corresponding elements throughout the views, FIG. 1 illustrates a vehicle 10 that can be an all terrain vehicle (ATV). However, in other embodiments, the vehicle 10 can be another type of saddle-type vehicle (e.g., a motorcycle, personal watercraft, or snowmobile), an automobile, a truck, or any of a variety of other types of vehicles. Vehicle 10 can include a frame 12 (FIG. 2), a pair of front wheels 14, and a pair of rear wheels 16 (one shown). Each of the front wheels 14 and each of the rear wheels 16 can be rotatably coupled with the frame 12. Vehicle 10 can also include a body 18 that can be supported by the frame 12. Body 18 can include a front fender assembly 20, a rear fender assembly 22, and a center panel assembly 24, according to one embodiment. Body 18 can at least partially define a left footwell 26 and a right footwell 28. The front fender assembly 20 can at least partially cover each of the front wheels 14, and the rear fender assembly 22 can at least partially cover each of the rear wheels 16. Vehicle 10 can further include a handlebar assembly 30 that can be coupled with the front wheels 14 to facilitate steering the front wheels 14. Vehicle 10 can also include a saddle-type seat 32, which can be supported by at least one of the frame 12 and the body 18, and which can be configured to support an operator of vehicle 10.

Vehicle 10 can include a source of motive power 34, which can be an internal combustion engine and/or an electric motor or any other suitable source of motive power. Vehicle 10 can also include a transmission (not shown) that can be coupled with the source of motive power 34, and a rear drivetrain (not shown) that can be coupled with the transmission and each of the rear wheels 16, such that the rear drivetrain is operable for transmitting torque from the transmission to the rear wheels 16, causing the rear wheels 16 to rotate. In some embodiments, the vehicle 10 can be configured as an all wheel drive (AWD) vehicle in which the transmission is also coupled with the front wheels 14. Vehicle 10 can also include a gear shift 36, which can be supported by at least one of the frame 12 and the body 18, and which can be coupled with the transmission.

Figure 2:
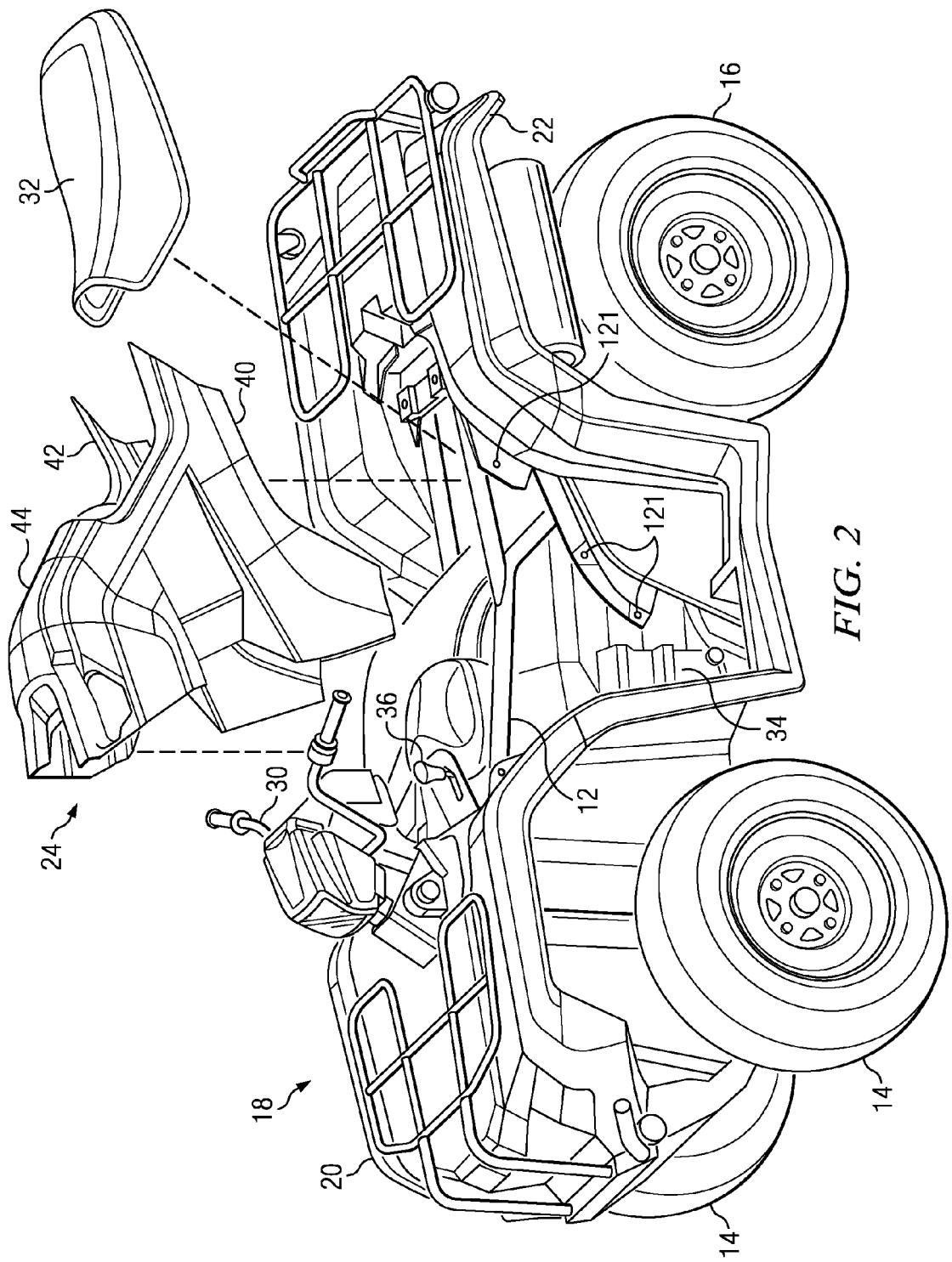
FIG. 2 is a partially exploded, left-front perspective view depicting the vehicle of FIG. 1, with the center panel assembly and a seat of the vehicle spaced apart from other parts of the vehicle.

The center panel assembly 24 of body 18 can extend longitudinally from the front fender assembly 20 to the rear fender assembly 22, and can extend from the left footwell 26 to the right footwell 28. The center panel assembly 24 can be releasably attached to the frame 12, and can be advantageously installed and removed as a unit. When installed, the center panel assembly 24 can cover the source of motive power 34, and can also cover other components of vehicle 10. Removal of the center panel assembly 24 can provide access to the source of motive power 34 as shown in FIG. 2, and can also provide access to other components of vehicle 10, such as for maintenance, repair, etc.

The center panel assembly 24 can include a left cover 40, a right cover 42, and a top cover 44. The left cover 40, the right cover 42, and the top cover 44 can be formed separately from one another, as separate unitary structures. In one embodiment, each of the left cover 40, the right cover 42, and the top cover 44 can be separately molded, using any suitable molding process, from any suitable polymeric material. The top cover 44 can be releasably attached to each of the left cover 40 and the right cover 42.

Figure 3:
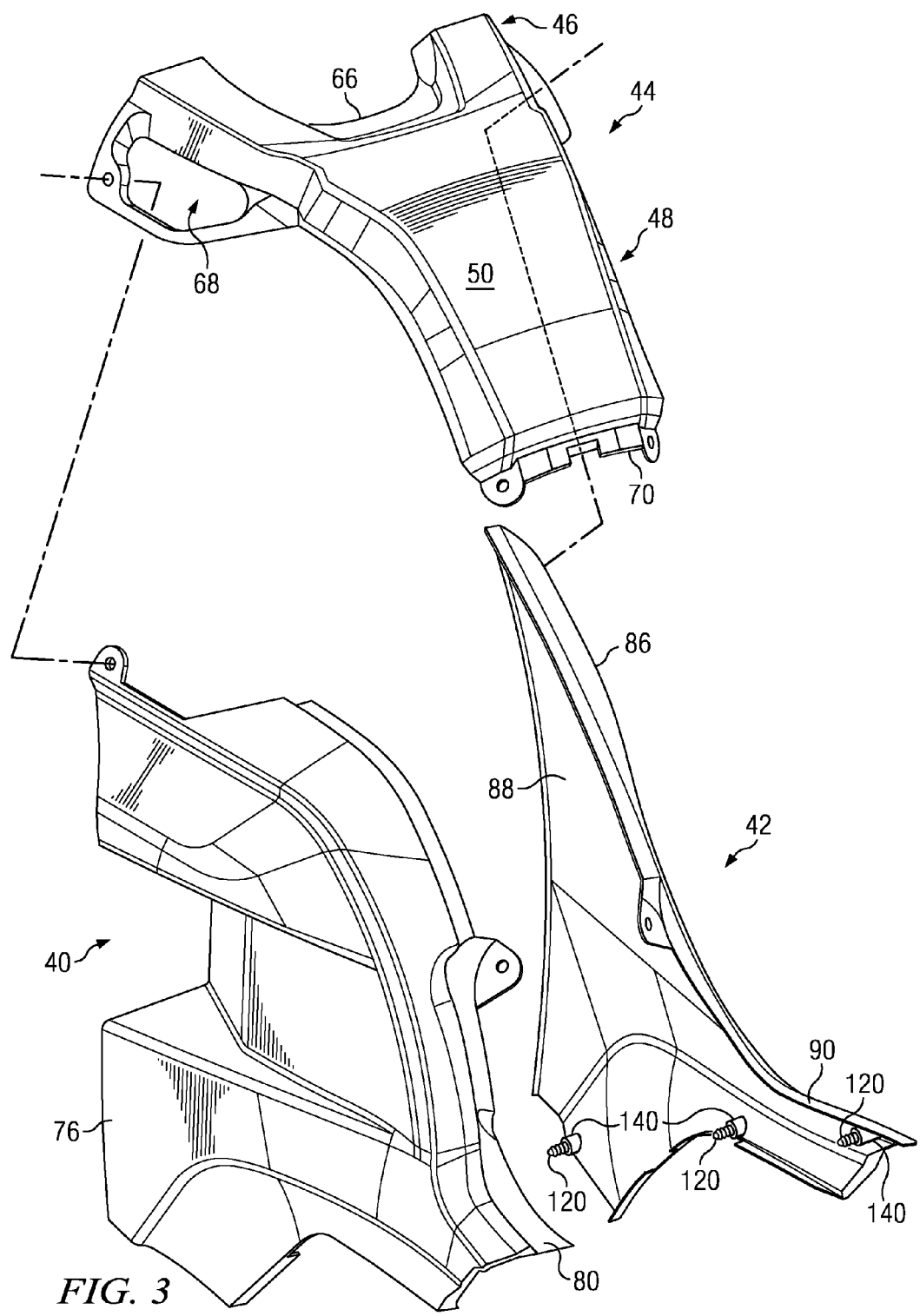
FIG. 3 is an exploded, left-rear perspective view depicting the center panel assembly of FIG. 1.
Figure 8:
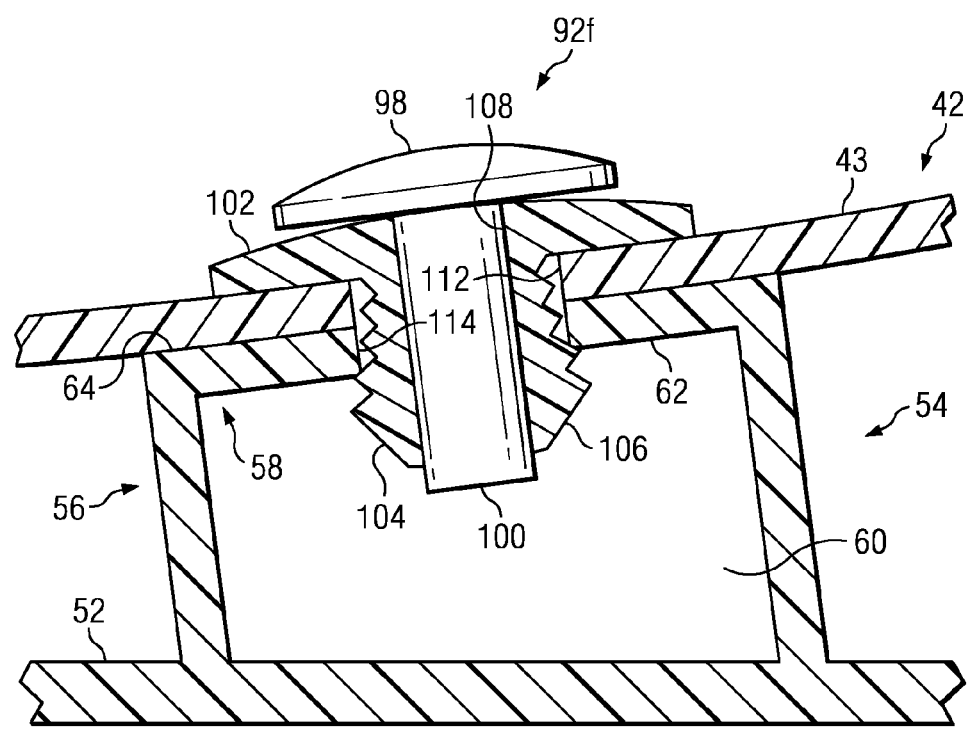
FIG. 8 is a cross-sectional view taken along line 8-8 in FIG. 4.

Referring to FIG. 3, the top cover 44 can include an upper portion 46 and a lower portion 48, which can be integral with the upper portion 46. The top cover 44 can also include an exterior surface 50 (FIG. 3), an interior surface 52 (FIG. 4), and a plurality of mount structures 54, which can be integral with the interior surface 52, as shown in FIG. 8. Each of the mount structures 54 can include a side wall 56 and an end wall 58, which can be integral with the side wall 56. The side wall 56 and the end wall 58 can cooperate with the interior surface 52 of the top cover 44 to define an interior space 60. The end wall 58 can include an inside surface 62 and an outside surface 64, and can be spaced inwardly from the interior surface 52 of the top cover 44, as shown in FIG. 8.

In one embodiment, each of the upper portion 46 and the lower portion 48 of the top cover 44 can be releasably attached to each of the left cover 40 and the right cover 42. The upper portion 46 of top cover 44 can include a generally U-shaped, forward portion 66 (FIG. 3), which can be positioned adjacent the handlebar assembly 30 when the center panel assembly 24 is installed, as shown in FIG. 1. The top cover 44 can also define an aperture 68, which can be configured and positioned such that the gear shift 36 can extend through the aperture 68 when the center panel assembly 24 is installed, as shown in FIG. 1. The top cover 44 can also include a seat flange 70, which can underlie, and support, the saddle-type seat 32. The left cover 40 can include an exterior surface 76 (FIG. 3), an interior surface 78 (FIG. 4), and a seat flange 80, which can underlie, and support, the saddle-type seat 32. Similarly, the right cover 42 can include an exterior surface 86 (FIG. 3), an interior surface 88 (FIGS. 3 and 4), and a seat flange 90, which can underlie, and support, the saddle-type seat 32.

Figure 5A:
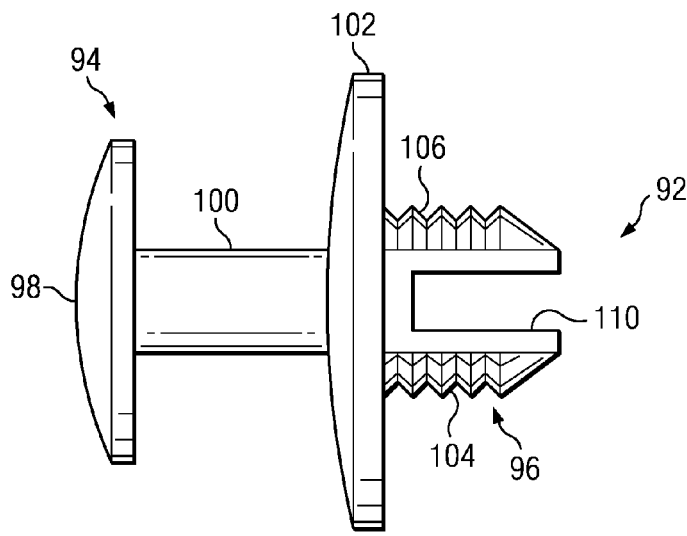
FIG. 5A is a perspective view of a Prior Art two-piece fastener, with the two-piece fastener being depicted in a released position.
Figure 5B:
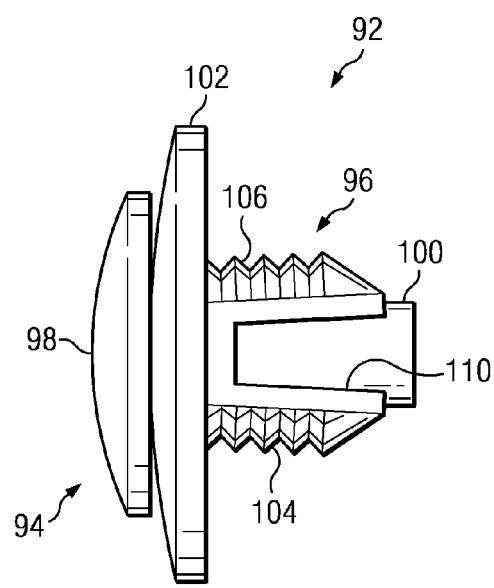
FIG. 5B is a perspective view of the Prior Art two-piece fastener of FIG. 5A, with the two-piece fastener being depicted in a secured position.

The center panel assembly 24 can include a plurality of two-piece fasteners 92. FIGS. 5A and 5B illustrate one of the two piece fasteners 92, separate from the remainder of the center panel assembly 24. The two-piece fasteners 92 can be used to releasably attach the top cover 44 of the center panel assembly 24 to each of the left cover 40 and the right cover 42.

Each of the two-piece fasteners 92 can include a first member 94 and a second member 96, as shown in FIGS. 5A and 5B. The first member 94 can be movable relative to the second member 96 between a released position shown in FIG. 5A and a secured position shown in FIG. 5B. The first member 94 can include a head 98 and a shank 100, which can be integral with, and extend away from, the head 98. The second member 96 can include a head 102, a first ribbed member 104, and a second ribbed member 106. Each of the first ribbed member 104 and the second ribbed member 106 can be integral with, and extend away from, the head 102. The head 102, the first ribbed portion 104, and the second ribbed portion 106 can cooperate to define a passage 108 (FIG. 8), which can be configured to receive the shank 100 of the first member 94. The first ribbed member 104 and the second ribbed member 106 can define a pair of longitudinally extending slots 110 (one shown in FIGS. 5A and 5B), which can communicate with the passage 108. The slots 110 can facilitate movement of the first ribbed portion 104 relative to the second ribbed portion 106, such that the first ribbed portion 104 and the second ribbed portion 106 can splay outwardly, when the shank 100 of the first member 94 of the two-piece fastener 92 is inserted into and progressively through the passage 108 defined by the second member 96 of the two-piece fastener 92.

Figure 4:
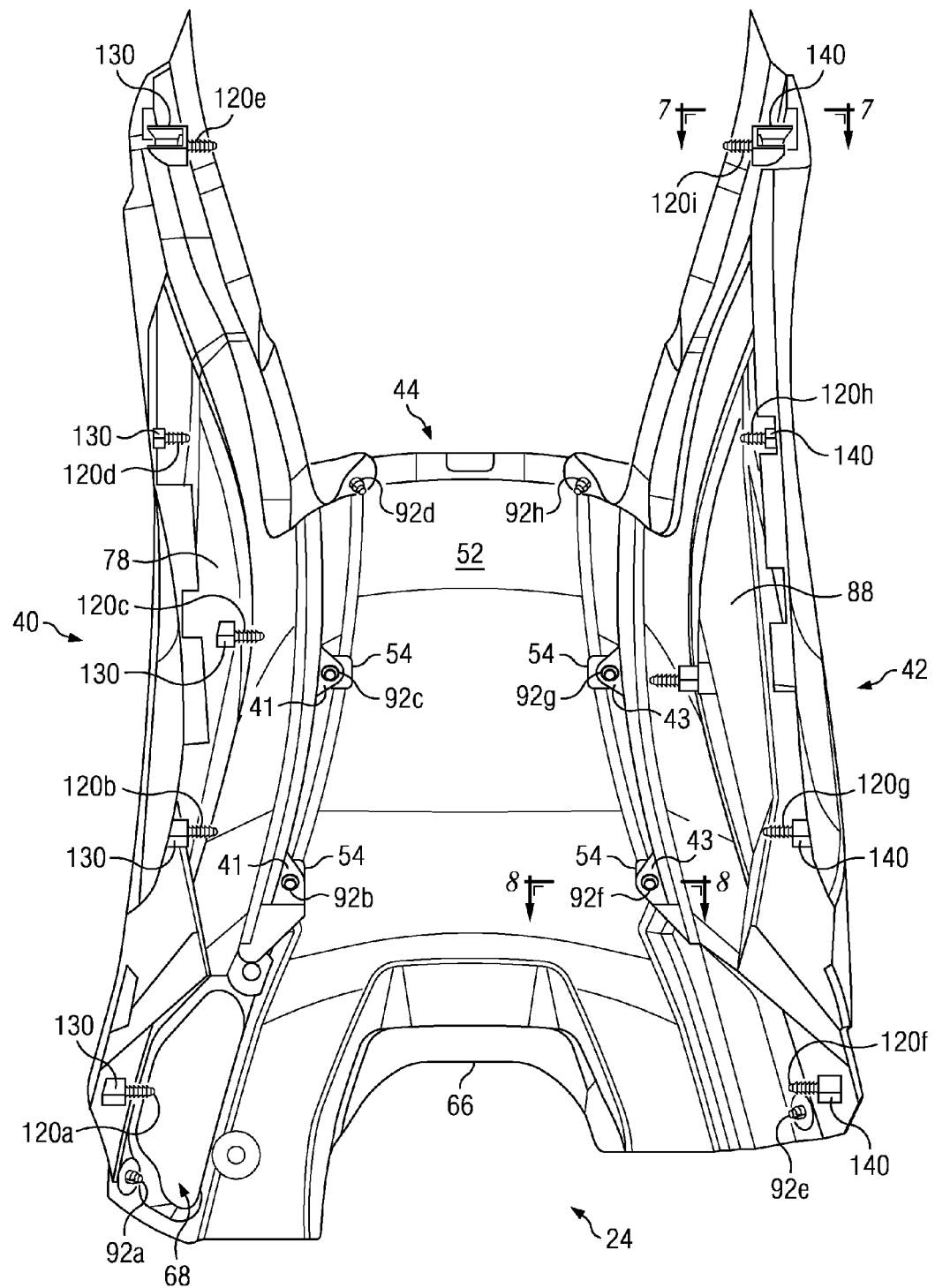
FIG. 4 is a bottom perspective view depicting the center panel assembly of FIG. 1 in an assembled configuration.

The top cover 44 of the center panel assembly 24 can be releasably attached to the left cover 40 of the center panel assembly 24 with a first plurality of the fasteners 92 and the top cover 44 can be releasably attached to the right cover 42 of the center panel assembly 24 with a second plurality of the fasteners 92. For example, in one embodiment, the top cover 44 can be releasably attached to the left cover 40 with the two-piece fasteners 92a, 92b, 92c, and 92d, as shown in FIG. 4, and the top cover 44 can be releasably attached to the right cover 42 with the two-piece fasteners 92e, 92f, 92g, and 92h, as shown in FIG. 4. However, in other embodiments, the top cover 44 can be attached to the left cover 40 and/or the right cover 42 with more or less of the two-piece fasteners 92 than those shown. In other embodiments, different types of two-piece fasteners, such as clips and associated male fasteners, can be used either with, or in lieu of, the two-piece fasteners 92 to attach the top cover 44 to each of the left cover 40 and the right cover 42. In yet other embodiments, a combination of two-piece fasteners and single-piece fasteners (e.g., ribbed fasteners or screws) can be used to attach the top cover 44 to each of the left cover 40 and the right cover 42.

Each of the two-piece fasteners 92b, 92c, 92f, and 92g, can be positioned entirely within an interior of the center panel assembly 24, such that the two-piece fasteners 92b, 92c, 92f, and 92g can be obscured from view when the center panel assembly 24 is installed on the vehicle 10. Each of the two-piece fasteners 92b and 92c can attach the left cover 40 to respective ones of the mount structures 54 of the top cover 44, and each of the two-piece fasteners 92f and 92g can attach the right cover 42 to respective ones of the mount structures 54 of the top cover 44.

The assembly of each of the two-piece fasteners 92b, 92c, 92f, and 92g can be illustrated with reference to the assembly of the two-piece fastener 92f, as shown in FIG. 8. The right cover 42 can be positioned in contacting engagement with the outside surface 64 of one of the mount structures 54 of the top cover 44. In one embodiment, the right cover 42 can include a plurality of mount tabs 43, and each of the mount tabs 43 can be positioned in contacting engagement with the outside surface 64 of a respective one of the mount structures 54 of the top cover 44. Similarly, the left cover 40 can include a plurality of mount tabs 41, and each of the mount tabs 41 can be positioned in contacting engagement with the outside surface 64 of a respective one of the mount structures 54.

Referring again to FIG. 8, the first ribbed portion 104 and the second ribbed portion 106 of the second member 96 of the two-piece fastener 92*f* can be inserted through an aperture 112 defined by one of the mount tabs 43 of the right cover 42, and through an aligned aperture 114 defined by the associated mount structure 54. As shown in FIG. 8, the head 102 of the second member 96 can be positioned in contacting engagement with the respective mount tab 43 of the right cover 42. The shank 100 of the first member 94 can be inserted into and through the passage 108 defined by the second member 96, which can force the first ribbed portion 104 and the second ribbed portion 106 to splay outwardly against the mount structure 54, such that the two-piece fastener 92*f* is in the secured position and releasably attaches the mount tab 43 of the right cover 42 to the mount structure 54. When desired, and with the center panel assembly 24 removed from the vehicle 10, the first member 94 of the two-piece fastener 92*f* can be moved relative to the second member 96 to the released position, which is shown in FIG. 5A for one of the two-piece fasteners 92, or the first member 94 can be completely disengaged from the second member 96 (e.g., using an appropriate tool positioned between the head 98 of the first member 94 and the head 102 of the second member), such that the right cover 42 is not secured to the respective mount structure 54.

In one embodiment, the two-piece fasteners 92*a* and 92*d*, which can also be used to releasably attach the top cover 44 to the left cover 40, do not extend into one of the mount structures 54 of the top cover 44. Similarly, in one embodiment, the two-piece fasteners 92*e* and 92*h*, which can be also used to releasably attach the top cover 44 to the right cover 42, do not extend into one of the mount structures 54 of the top cover 44. Rather, the two-piece fasteners 92*a*, 92*d*, 92*e* and 92*h*, can be installed from an exterior of the center panel assembly 24. In one embodiment, the two-piece fasteners 92*d* and 92*h* can each be obscured from view by the saddle-type seat 32 of the vehicle 10. Positioning the two-piece fasteners 92*b*, 92*c*, 92*d*, 92*f*, 92*g* and 92*h*, such that they can be obscured from view when the center panel assembly 24 is installed on vehicle 10, can enhance the decorative appearance of vehicle 10. Although the two-piece fasteners 92*a* and 92*e* may not be obscured from view, due to the proximity of the two-piece fasteners 92*a* and 92*e* to the gear shift 36 and the handlebar assembly 30, respectively, the decorative appearance of the vehicle 10 may not be adversely affected by the presence and location of the two-piece fasteners 92*a* and 92*e*.

Figure 6:
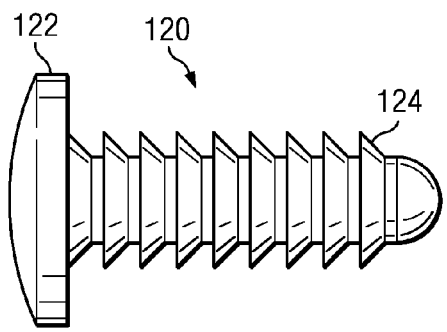
FIG. 6 is a perspective view of a Prior Art single-piece fastener.
Figure 7:
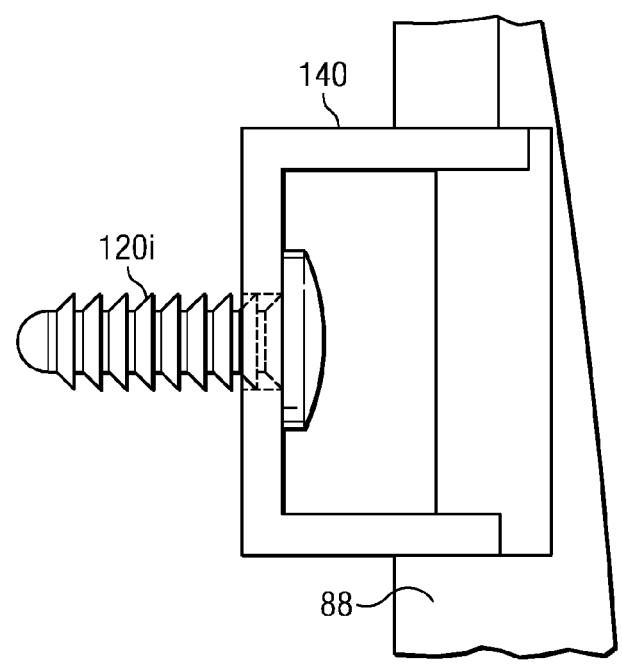
FIG. 7 is a front elevation view taken from an interior of the center panel assembly depicted in FIGS. 1-4, depicting a mount structure of a right cover of the center panel assembly, an associated fastener, and a portion of an interior surface of the right cover.

The center panel assembly 24 can include a plurality of single-piece, ribbed fasteners 120 (one shown in FIG. 6), which can be used to releasably attach the center panel assembly 24 to the frame 12 and/or another portion of body 18, such as the front fender assembly 20 and/or the rear fender assembly 22 of vehicle 10. Each of the single-piece, ribbed fasteners 120 can include a head 122 and a ribbed shank 124 that can be integral with, and extend away from, the head 122. A first plurality of the single-piece, ribbed fasteners 120 can be used to releasably attach the left cover 40 to the frame 12 and/or another portion of body 18, and a second plurality of the single-piece, ribbed fasteners 120 can be used to releasably attach the right cover 42 to the frame 12 and/or another portion of body 18, such that the center panel assembly 24 is releasably attached to the frame 12 and/or another portion of body 18, such as the front fender assembly 20 and/or the rear fender assembly 22. For example, as shown in FIG. 4, in one embodiment, single-piece ribbed fasteners 120*a*, 120*b*, 120*c*, 120*d* and 120*e* can each be engaged with a respective one of a plurality of mount structures 130 of the left cover 40, and the ribbed shank 124 of each can extend into a respective aperture (not shown) defined by the frame 12 or a respective aperture defined by body 18 (e.g., apertures 121 (FIG. 2) defined by the rear fender assembly 22 of body 18). The ribbed shank 124 of each of the single-piece, ribbed fasteners 120*a*, 120*b*, 120*c*, 120*d* and 120*e* can engage the frame 12 or a respective portion of body 18, to releasably attach the left cover 40 to the frame 12 and/or another portion of the body 18, such as the front fender assembly 20 and/or the rear fender assembly 22 of body 18. The mount structures 130 of the left cover 40 can have various sizes and shapes, such as shown in FIG. 4, depending upon the location of the particular mount structure 130 on the left cover 40. Similarly, in one embodiment, single-piece, ribbed fasteners 120*f*, 120*g*, 120*h* and 120*i* can each engage a respective one of a plurality of mount structures 140 of the right cover 44, as shown in FIG. 4, and as also shown in FIG. 7 with respect to the single-piece, ribbed fastener 120*i*. The ribbed shank 124 of each of the single-piece, ribbed fasteners 120*f*, 120*g*, 120*h* and 120*i* can extend into a respective aperture (not shown) defined by the frame 12 or a respective aperture (not shown) defined by body 18. The ribbed shank 124 of each of the single-piece, ribbed fasteners 120*f*, 120*g*, 120*h* and 120*i* can engage the frame 12 or a respective portion of body 18, to releasably attach the right cover 42 to the frame 12 and/or another portion of the body 18, such as, the front fender assembly 20 and/or the rear fender assembly 22 of body 18. By removing the single-piece, ribbed fasteners 120*a*, 120*b*, 120*c*, 120*d*, 120*e*, 120*f*, 120*g*, 120*h* and 120*i*, the center panel assembly 24 can be detached from the frame 12, and removed as a unit, when desired. In other embodiments, the center panel assembly 24 can be releasably attached to the frame 12 and/or another portion of the body 18, such as the front fender assembly 20 and/or the rear fender assembly 22, using more or less of the single-piece, ribbed fasteners 120 than those shown.

When the center panel assembly 24 is installed, the lower portion 48 of the top cover 44 can extend downwardly and rearwardly away from the upper portion 46 of the top cover 44, and can be longitudinally spaced from the rear fender assembly 22. The left cover 40 can extend longitudinally from the front fender assembly 20 to the rear fender assembly 22, and can extend downwardly from the top cover 44 into the left footwell 26 as shown in FIG. 1. Similarly, the right cover 42 can extend longitudinally from the front fender assembly 20 to the rear fender assembly 22 and can extend downwardly from the top cover 44 into the right footwell 28, as will be appreciated with reference to FIGS. 1 and 2.

The releasable attachment of the top cover 44 to each of the left cover 40 and the right cover 42 can permit the center panel assembly 24 to be installed on, and removed from, the vehicle 10 as a unit, and without removal of the front fender assembly 20 or the rear fender assembly 22, which can reduce assembly time and cost. The removal of the center panel assembly 24 can provide convenient and efficient access to the source of motive power 34 of vehicle 10, and can also provide access to other components of vehicle 10. The use of two-piece fasteners, such as the two-piece fasteners 92, to releasably attach the top cover 44 to each of the left cover 40 and the right cover 42, can permit at least some of the two-piece fasteners to be positioned entirely within the interior of the center panel assembly 24. As a result, at least these two-piece fasteners can be obscured from view, which can enhance the decorative appearance of the vehicle 10.

While various embodiments of a center panel assembly of a body of a vehicle, a vehicle that includes a body having a center panel assembly, and a saddle-type vehicle that includes a body having a center panel assembly, have been illustrated by the foregoing description and have been described in considerable detail, it is not intended to restrict or in any way limit the scope of the appended claims to such detail. Additional modifications will be readily apparent to those skilled in the art.

What is claimed is:

1. A center panel assembly for a body of a vehicle, the center panel assembly comprising:
   a left cover;
   a right cover;
   a top cover; and
   a plurality of fasteners; wherein:
   the top cover is releasably attached to the left cover with at least a first one of the plurality of fasteners and is releasably attached to the right cover with at least a second one of the plurality of fasteners;
   the center panel assembly is configured for releasable attachment to a frame of a vehicle;
   each of the plurality of fasteners comprises a two-piece fastener comprising a first member and a second member, the first member comprising a first head and a shank extending away from the first head, the second member comprising a second head, a first ribbed portion and a second ribbed portion, each of the first ribbed portion and the second ribbed portion being integral with the second head; and
   for each of the two-piece fasteners, the second head, the first ribbed portion, and the second ribbed portion cooperate to define a passage, and the shank of the first member is inserted into and through the passage such that the first ribbed portion and the second ribbed portion splay outwardly to releasably attach the top cover to the respective one of the left cover and the right cover.

2. The center panel assembly of claim 1, wherein:
   the at least a first one of the plurality of fasteners comprises a first plurality of the fasteners and the at least a second one of the plurality of fasteners comprises a second plurality of the fasteners; and
   at least some of the first plurality of the fasteners and at least some of the second plurality of the fasteners are obscured from view when the center panel assembly is installed on a vehicle.

3. The center panel assembly of claim 2, wherein:
   each of the left cover, the right cover, and the top cover comprises a respective seat flange; and
   each of the seat flange of the left cover, the seat flange of the right cover, and the seat flange of the top cover, is configured to underlie a saddle-type seat of a vehicle.

4. The center panel assembly of claim 2, wherein:
   the top cover comprises an upper portion and a lower portion, the lower portion being integral with, and extending away from, the upper portion;
   the upper portion of the top cover comprises a generally U-shaped, forward portion configured to be positioned adjacent a handlebar assembly of a vehicle; and
   the upper portion of the top cover defines an aperture configured to receive a gear shift of a vehicle.

5. The center panel assembly of claim 4, wherein:
   each of the upper portion and the lower portion of the top cover is releasably attached to each of the left cover and the right cover.

6. A vehicle comprising:
   a frame;
   at least one front wheel rotatably coupled with the frame;
   at least one rear wheel rotatably coupled with the frame;
   an engine supported by the frame; and
   a body supported by the frame, the body comprising a front fender assembly, a rear fender assembly, and a center panel assembly, the center panel assembly extending longitudinally from the front fender assembly to the rear fender assembly, the center panel assembly comprising a left cover, a right cover, a top cover, a first plurality of fasteners, and a second plurality of fasteners; wherein:
   the center panel assembly covers the engine;
   the top cover is releasably attached to each of the left cover and the right cover with the first plurality of fasteners;
   the first plurality of fasteners extend through each of the left cover, the right cover, and the top cover;
   the left cover and the right cover are releasably secured to the frame with the second plurality of fasteners such that releasement of the second plurality of fasteners from the frame with the center cover, the right cover, and the left cover coupled together allows for removal of the center panel assembly as an individual unit; and
   the second plurality of fasteners are secured to each of the left cover and the right cover but do not extend therethrough.

7. The vehicle of claim 6, wherein:
   the top cover comprises an upper portion and a lower portion, the lower portion being integral with, and extending downwardly and rearwardly away from, the upper portion; and
   each of the upper portion and the lower portion of the top cover is releasably attached to each of the left cover and the right cover.

8. The vehicle of claim 7, further comprising:
   a handlebar assembly coupled with the at least one front wheel; wherein
   the upper portion of the top cover comprises a generally U-shaped, forward portion positioned adjacent the handlebar assembly.

9. The vehicle of claim 6, wherein:
   the top cover comprises an interior surface, an exterior surface and a plurality of mount structures integral with the interior surface;
   at least some of the first plurality of fasteners releasably attach the left cover to respective ones of the mount structures of the top cover, and are obscured from view; and
   at least others of the first plurality of fasteners releasably attach the right cover to respective ones of the mount structures of the top cover, and are obscured from view.

10. The vehicle of claim 9, wherein:
    each of the first plurality of fasteners comprises a two-piece fastener, each of the two-piece fasteners comprising a first member and a second member, the first member comprising a first head and a shank, the second member comprising a second head, a first ribbed portion and a second ribbed portion, each of the first ribbed portion and the second ribbed portion being integral with the second head; and
    for each of the two-piece fasteners, the second head, the first ribbed portion, and the second ribbed portion cooperate to define a passage, and the shank of the first member is inserted into and through the passage such that the first ribbed portion and the second ribbed portion splay outwardly to releasably attach the top cover to the respective one of the left cover and the right cover.

11. The vehicle of claim 10, wherein:
    the body at least partially defines a left footwell and a right footwell;

the left cover extends longitudinally from the front fender assembly to the rear fender assembly and extends downwardly from the top cover into the left footwell;

the right cover extends longitudinally from the front fender assembly to the rear fender assembly and extends downwardly from the top cover into the right footwell;

the top cover is longitudinally spaced from the rear fender assembly.

12. A saddle-type vehicle comprising:

a frame;

at least one front wheel rotatably coupled with the frame;

at least one rear wheel rotatably coupled with the frame;

a handlebar assembly coupled with the at least one front wheel;

an engine supported by the frame;

a body supported by the frame, the body comprising a front fender assembly, a rear fender assembly, and a center panel assembly, the center panel assembly comprising a left cover, a right cover, a top cover, a first plurality of fasteners, a second plurality of fasteners and a third plurality of fasteners; and a saddle-type seat supported by at least one of the frame and the body; wherein the center panel assembly extends longitudinally from the front fender assembly to the rear fender assembly and covers the engine, the center panel assembly being releasably attached to at least one of the frame, the front fender assembly and the rear fender with the third plurality of fasteners;

the top cover comprises an exterior surface, an interior surface, and a plurality of mount structures integral with the interior surface;

at least some of the first plurality of fasteners releasably attach the left cover to respective ones of the mount structures of the top cover, and are obscured from view; and at least some of the second plurality of fasteners releasably attach the right cover to respective ones of the mount structures of the top cover, and are obscured from view.

13. The saddle-type vehicle of claim 12, wherein:

each of the first plurality of fasteners comprises a two-piece fastener;

each of the second plurality of fasteners comprises a two-piece fastener; and each of the third plurality of fasteners comprises a single-piece, ribbed fastener.

14. The saddle-type vehicle of claim 13, wherein:

each of the mount structures comprises a side wall integral with the interior surface of the top cover, and an end wall integral with the side wall, the end wall being spaced inwardly from the interior surface of the top cover, the end wall being spaced inwardly from the interior surface of the top cover, the side wall and the end wall cooperating with the interior surface of the top cover to define an interior space;

at least an additional one of the first plurality of two-piece fasteners releasably attaches the left cover to the top cover and is spaced from the mount structures of the top cover and obscured from view by the saddle-type seat; and at least an additional one of the second plurality of two-piece fasteners releasably attaches the right cover to the top cover and is spaced from the mount structures of the top cover and obscured from view by the saddle-type seat.

15. The saddle-type vehicle of claim 13, wherein:

each of the first plurality of two-piece fasteners and each of the second plurality of two-piece fasteners comprises a first member and a second member, the first member comprising a first head and a shank, the second member comprising a second head, a first ribbed portion and a second ribbed portion, each of the first ribbed portion and the second ribbed portion being integral with the second head; and for each of the first plurality of two-piece fasteners, the second head, the first ribbed portion, and the second ribbed portion cooperate to define a passage, and the shank of the first member is inserted into and through the passage such that the first ribbed portion and the second ribbed portion splay outwardly to releasably attach a respective one of the mount structures of the top cover to the left cover; and for each of the second plurality of two-piece fasteners, the second head, the first ribbed portion and the second ribbed portion cooperate to define a passage, and the shank of the second member is inserted into and through the passage such that the first ribbed portion and the second ribbed portion splay outwardly to releasably attach a respective one of the mount structures of the top cover to the right cover.

16. The saddle-type vehicle of claim 12, wherein:

each of the left cover, the right cover, and the top cover comprises a respective seat flange; and each of the seat flange of the left cover, the seat flange of the right cover, and the seat flange of the top cover underlies and supports the saddle-type seat.

17. The saddle-type vehicle of claim 12, wherein:

the top cover comprises an upper portion and a lower portion, the lower portion being integral with, and extending downwardly and rearwardly away from, the upper portion; and each of the upper portion and the lower portion of the top cover is releasably attached to each of the left cover and the right cover.

18. The saddle-type vehicle of claim 12, wherein:

the body at least partially defines a left footwell and a right footwell;

the left cover extends longitudinally from the front fender assembly to the rear fender assembly and extends downwardly from the top cover into the left footwell;

the right cover extends longitudinally from the front fender assembly to the rear fender assembly and extends downwardly from the top cover into the right footwell;

the top cover is spaced from the rear fender assembly.

\* \* \* \* \*